(12) United States Patent
Wimmer

(10) Patent No.: US 6,235,826 B1
(45) Date of Patent: May 22, 2001

(54) COATING AGENT FOR PRODUCING AN ELECTRIC INSULATING COATING ON AN ELECTRO STEEL SHEET

(75) Inventor: Michael Wimmer, Modling (AT)

(73) Assignee: Herberts Austria GmbH (AT)

( * ) Notice: Subject to any disclaimer, the term of this patent is extended or adjusted under 35 U.S.C. 154(b) by 0 days.

(21) Appl. No.: 09/319,389

(22) PCT Filed: Nov. 27, 1997

(86) PCT No.: PCT/AT97/00259

§ 371 Date: May 27, 1999

§ 102(e) Date: May 27, 1999

(87) PCT Pub. No.: WO98/24164

PCT Pub. Date: Jun. 4, 1998

(30) Foreign Application Priority Data

Nov. 29, 1996 (AT) ........................................ 2078/96

(51) Int. Cl.⁷ .................... C08J 3/00; C08K 5/04; C08K 5/09; C08K 61/22; C08L 61/00
(52) U.S. Cl. ........................ 524/398; 524/593; 524/594; 524/595; 524/596; 524/597; 524/598; 524/599; 524/601
(58) Field of Search ..................... 524/398, 593, 524/594, 595, 596, 597, 598, 599, 601

(56) References Cited

U.S. PATENT DOCUMENTS 3,925,313  12/1975  Kojima et al. .
4,208,464   6/1980  Ishizuka et al. .
4,874,806  10/1989  Kay et al. .
5,314,984   5/1994  Markovitz et al. .

FOREIGN PATENT DOCUMENTS 53-115627  10/1978  (JP) .

OTHER PUBLICATIONS

Knittel, Hans, "Lehrbuch der Lacke und Beschichtungen", pp. 396–398 ff, Bd.III, 1976.

*Primary Examiner*—Patrick D. Niland
(74) *Attorney, Agent, or Firm*—Piper Marbury Rudnick & Wolfe

(57) ABSTRACT

Coating agent for producing an electric insulating coating on an electro steel sheet with good punching quality, weldability, annealing stability and high insulation resistance. Said agent comprises a metal organic and an organic film-forming agent and, optionally, chemically inert inorganic pigments and/or filler and other common additives such as antifoaming agents, leveling agents, catalyzers and the like. Said agent is characterized in that the metal organic components consist of tetravalent metallic acid esters or metal-chelate complexes of the general formula $M_4(OR)_4$, in which M stands for titanium or zirconium and R stands for equal or different, straight chain or branched, saturated or unsaturated $C_1$–$C_{20}$ alkyl radicals or chelates, dialkylamine or trialkylamine, dialkanolamine or trialkanolamine, monoglycolate or diglycolate, acetyl acetonate, ethyl acetoacetate or ammonium lactate and the organic component is composed of water-soluble polymer, acryl, acryl copolymer, alkyd, phenol or amino resins, which exhibit groups that can be neutralized or that can be easily distributed with emulsifiers in an aqueous medium.

15 Claims, No Drawings

COATING AGENT FOR PRODUCING AN ELECTRIC INSULATING COATING ON AN ELECTRO STEEL SHEET

The object of the present invention is a coating agent for producing an electric insulating coating on an electro steel sheet.

It is known that in the production of magnetizable cores of electric drive means—such as transformers, generators or motors—individual sheets are stacked into a solid core. These electro steel sheets must be electrically insulated from one another. Before the stacking of the sheets piece-material must be punched in the form of segments out of a continuous electro band. As connecting method of the sheet stack there can take place besides clamping, riveting and screwing down also a welding. In order to obtain ideal magnetic properties even after the thermal and mechanical loads mentioned, such an iron core can be subjected to a closing annealing.

Coatings of electro steel sheet material with the requisite punching quality, weldability and annealing stability are built up of a combination of and inorganic and of an organic film former and can contain, furthermore, also pigments and fillers. Such coatings are present on the market as phosphate or chromate types and are state of the art. Phosphate types, however, have too high a brittleness which has a negative effect on the adhesion to the electro steel sheet and leads to a reduced punching quality of the coated sheets. Chromate types are problematical from the standpoint of compatibility with the environment. Both systems have, furthermore, a pH value in the severely acid range, which has a negative effect in the form of corrosion manifestations on the application arrangements.

The problem of the present invention was to make available a coating agent for producing an electrically insulating coating which does not have the aforementioned disadvantages of the coating systems of hitherto and is unrestrictedly weldable and annealing stable with a good punching quality of the coated electro steel sheets.

The object of the present invention, therefore, is a coating agent for producing an electrically insulating coating on an electro steel sheet with good punching quality, weldability, annealing stability and a high insulation resistance, which consists of a metal organic and an organic film former as well as, optionally, of chemically inert inorganic pigments and/or fillers and other usual additives, such as antifoaming agents, leveling agents, catalysts and the like. The coating agent according to the invention is characterized in that the metal organic compound consists of tetravalent metal acid esters or metal chelate complexes of the general formula $M_4(OR)_4$ wherein M is titanium or zirconium, and R is equal or different, straight chained or branched, a dialkylamine or trialkylamide, a dialkanolamine or trialkanolamine, a monoglycolate or diglycolate, an acetyl acetonate, an ethyl acetoacetate, or an ammonium lactate and the organic component consists of a water-dilutable polyester, an acryl, an acryl-copolymer, an alkyl, a phenol or amino-resin that have neutralizable groups or are easily distributed with emulsifiers in an aqueous medium.

According to a special form of execution, the coating material of the invention is present as a two-component preparation.

The applying of same to the substrate preferably occurs by rolling or spraying. The hardening-out of the coating is carried out at a temperature between 150° C. and 450° C., preferably between 250° C. and 350° C., during a period of at least 10 seconds.

As organic bonding components there are suited synthetic resins such as, for example, dispersions having a base of acrylates, of styrene or of butadiene. Moreover, a combination of the afore-mentioned resins is also possible.

To increase the layer thickness there can be used inorganic fillers, such as, for example, ceramic ones, and/or pigments. Fillers and pigments are used which, however, must be inert in respect to their chemical composition. Preferably there are to be used fillers with an average grain diameter of less than $1\mu$, since by reason of the usual layer thickness of 1 to $4\mu$ of such coatings, fillers with a greater mean grain diameter can cause leveling disturbances of the coatings.

A substantial advantage lies in that the coatings produced with the coating agent of the invention have a high insulation resistance, and a fault-free welding seam can be drawn with high speed for the holding-together of the stacked sheets. After the final annealing of the coated and bonded sheet stack a high level of insulation resistance is preserved. The processing of the coating agent of the invention can take place, in contrast to conventional strong acid and chromate-containing coating agents, with little corrosion to and to the highest degree safely. Neither is there any impairment of the environment, so that special precautionary measures with the use of this coating system can be omitted.

The invention is described in detail in, the following with the aid of examples, without, however, being restricted to these.

EXAMPLE 1

One-component transparent lacquer on the basis on the basis of a triethanolamine titanate with an acrylic resin as organic binder: There are mixed the following:

54 parts by wt. of triethanolamine titanate (80% in isopropanol)

14 parts by wt. of an acrylic resin 1 part by wt. of dimethyl ethanolamine 25 parts by weight of fully desalted water.

For the prevention of foam formation there are added to the mixture 0.5 parts by wt. of a boundary surface-active substance. In order to achieve a good leveling on the sheet substrate in the roller application, there can additionally be added 6 parts by wt. of methyl diglycol.

This formulation was applied by means of roller application to electro steel sheet material of the quality V800-50A and thereupon hardened out at a temperature of 300° C. over a period of 30 seconds. The dry layer thickness was $1.5\mu \pm 0.2\mu$. The properties of the generated coating are to be seen from the following table.

EXAMPLE 2

One-component pigmented lacquer based on a triethyanolamine titanate with an acrylic-resin as organic binder:

49 parts by wt of triethanolamine titanate (80% in isopropanol)

13 parts by wt. of an acrylic resin 1 part by weight of dimethyl ethanolamine 10 parts by wt. of highly dispersed silicic acid 30 parts by wt. of fully desalted water are mixed in a dispersion agitating mechanism.

For the prevention of foam formation there are added 0.5 parts by wt. of a boundary surface-active substance to the mixture. In order to achieve a good leveling on the sheet substrate in the roller application, there can be additionally added 6 parts by wt. of methyl diglycol.

The processing took place under the conditions of example 1. The properties of the generated coating are to be seen from the following table.

EXAMPLE 3

Two-component pigmented lacquer on the basis of an acetylacetone titanate with an acrylic resin cross-linkable with melamine resins as organic binder:

Two separate components are produced which are mixed in the mixing ratio A:B=1:2 immediately before the processing. Working life of this mixture amounts to 24 hours, at room temperature.

Component A:
  There are mixed the following:
    100 parts by wt. of a titanium acetyl acetone (75% in isopropanol)
    20 parts by wt. of a dihydroxy-bis-(ammonium lactate) titanate (50% in water)

Component B:
  There are mixed the following:
    24 parts by wt. of an acrylate resin
    2 parts by wt. of dimethyl ethanolamine
    40 parts by wt. of fully desalted water
    3 parts by wt. of partially methylated melamine resin
    15 parts by wt. of aluminum silicate with a mean grain diameter of less than 2

To prevent foam formation 1 part by wt. of a boundary surface-active substance is added to the component B. In order to achieve a good leveling on the sheet substrate in the roller application, there can additionally be added to component B 3 parts by wt. of butyl diglycol.

After mixing of components A and B the coating agent was processed as described in example 1. The properties of the generated coating are to be seen from the table below.

The measured property values of the electro steel sheets coated according to examples 1 to 3 are listed in the following table:

In line 2 there is given the dry coating thickness in $\mu$.

In line 3 there is given the alteration of the coating in a solvent wiping test with acetone. Here, after a 30-time wiping back and forth of a swab soaked with acetone the alteration of the film surface was judged.

In line 4 there is given the adhesive strength or elasticity of the coating, which was measured with the conical mandrel according to standard ISO 6860. As feature, there is given the diameter of the bending in mm under which no cracks are to be observed.

In line 5 the crosscut test is given, in which there was used a multiblade apparatus B according to standard DIN 53151. The evaluation is made from GtO to Gt5.

In line 6 there is given the corrosion stability according to standard DIN 50017, in which the coated sheet was subjected for 8 hours to an atmosphere of 40° C. and 100% relative air humidity. Over the following 16 hours there occurred a slow decrease to normal environmental conditions. The determination of corrosion occurred according to standard DIN 53210.

In line 7 there is given the insulation resistance before the annealing with the Franklin tester standardized according to standard ASTM A717-81 in the $\Omega.cm^2$ unit.

As in line 7, also in line 8 the insulation resistance is given, only the measurement was made after the annealing process described in standard DIN 46400/2.

In line 9 there is given the maximally possible welding speed at which there can be achieved a bubble-free and pinhole-free welding seam (according to the steel-and-iron test sheet SEP 1210).

|    | Property | Example I | Example 2 | Example |
|----|----------|-----------|-----------|---------|
| 1. | Property | Example I | Example 2 | Example |
| 2. | Dry coating thickness | 1.5 ± 0.2 | 1.5 ± 0.2 | 1.5 ± 0.2 |
| 3. | Solvent stability 30 times with acetone | No change | No change | No change |
| 4. | Adhesiveness with conical mandrel ISO 6860 | 3 mm | 3 mm | 3 mm |
| 5. | Crosscut DIN 53151 | GtO | GtO | GtO |
| 6. | Corrosion stability DIN 50017, 53210 | Ri 1 | Ri 1 | RiO |
| 7. | Insulation resistance before the annealing ASTM A 717-81 | >50 $\Omega.cm^2$ | >50 $\Omega cm^2$ | >100 $\Omega.cm^2$ |
| 8. | Insulation resistance after the annealing DIN 46400/2, ASTM A717-81 | >20 $\Omega.cm^2$ | 20 $\Omega.cm^2$ | 50 $\Omega.cm^2$ |
| 9  | Welding speed SEP 1210 | 1000 mm/min | 1360 mm/min | 750 mm/min |

What is claimed is:

1. A coating agent for producing an electric insulating coating on an electro steel sheet with good punching quality, weldability, annealing stability and a high insulation resistance, said agent comprising:

a metal organic and an organic film former, the metal organic component being selected from the group consisting of tetravalent metallic acid esters and metal-chelate complexes, either having the general formula $M(OR)_4$ in which M stands for titanium or zircon and R stands for equal or different, straight-chained or branched, saturated or unsaturated $C_1$–$C_{20}$ alkyl residues or chelates which are selected from the group consisting of dialkylamine, trialkylamine, dialkanolamine, trialkanolamine, monoglycolate, diglycolate, acetyl acetonate, ethyl acetoacetate, and ammonium lactate, and the organic component being selected from the group consisting of water-dilutable polyester, acryl acrylcopolymer, alkyd, phenol and amino resins which have neutralizable groups or which can be dispersed in an aqueous medium with emulsifiers.

2. A coating agent according to claim 1 including, additionally, at least one member selected from the group consisting of chemically inorganic pigments and/or fillers, antifoaming agents, leveling agents, and catalysts.

3. Coating agent according to claim 1, wherein the applying to the substrate occurs by spraying.

4. Coating agent according to claim 1, wherein the hardening-out of the coating takes place at a temperature between 150 and 450° C. during a time period of at least 10 seconds.

5. Coating agent according to claim 4, wherein the hardening-out takes place at a temperature between 250 to 350° C.

6. Coating agent according to claim 1, wherein it is present as a two-component preparation.

7. Coating agent according to claim 6 wherein the apply to the substrate occurs by rolling.

8. Coating agent according to claim 6, wherein the hardening-out of the coating takes place at a temperature between 150 and 450° C. during a time period of at least 10 seconds.

9. Coating agent according to claim 8, wherein the hardening-out takes place at a temperature between 250 to 350° C.

10. Coating agent according to claim 1, wherein the applying to the substrate occurs by rolling.

11. Coating agent according to claim 10, wherein the hardening-out of the coating takes place at a temperature between 150 and 450° C. during a time period of at least 10 seconds.

12. Coating agent according to claim 11, wherein the hardening-out takes place at a temperature between 250 to 350° C.

13. Coating agent of claim 3, wherein the hardening-out of the coating takes place at a temperature between 150 and 450° C. during a time period of at least 10 seconds.

14. Coating agent according to claim 13, wherein the hardening-out takes place at a temperature between 250 to 350° C.

15. Coating agent according to claim 6, wherein the applying to the substrate occurs by spraying.

* * * * *